United States Patent [19]

Lee

[11] 3,867,144

[45] Feb. 18, 1975

[54] SPECTRALLY SENSITIZED ELECTROPHOTOGRAPHIC MATERIALS

[75] Inventor: Wendell Maurice Lee, Lawrence Township, Mercer County, N.J.

[73] Assignee: RCA Corporation, New York, N.Y.

[22] Filed: Oct. 28, 1971

[21] Appl. No.: 193,573

[52] U.S. Cl. .................................. 96/1.7, 96/1.6
[51] Int. Cl. ...................... G03g 5/06, G03g 5/08
[58] Field of Search ................. 96/1.5, 1.6, 1.7, 1.8, 96/89, 90, 139

[56] References Cited
UNITED STATES PATENTS 3,600,165    8/1971    Willems et al. ...................... 96/1.7
3,622,341   11/1971    Lee ...................................... 96/1.7

Primary Examiner—Charles E. Van Horn
Attorney, Agent, or Firm—Glenn H. Bruestle; Arthur I. Spechler

[57] ABSTRACT

A spectrally sensitized electrophotographic recording element includes a photoconductive layer comprising zinc oxide and a small quantity of at least one azomethine dye that has either an o,o'-dihydroxy or an o-hydroxy-o'-mercapto azomethine structure.

6 Claims, No Drawings

SPECTRALLY SENSITIZED ELECTROPHOTOGRAPHIC MATERIALS

BACKGROUND OF THE INVENTION

This invention relates generally to spectrally sensitized electrophotographic materials, and more particularly to novel-dye-sensitized electrophotographic materials. The novel dye-sensitized electrophotographic materials are particularly applicable for use as recording elements in the electrophotographic art.

The photoconductivity of certain electrophotographic materials, such as photoconductive zinc oxide, for example, is not responsive to, that is, not affected by, all wavelengths of light in the visible spectrum. It has been proposed to sensitize these materials to light in the visible spectrum by treating them with a small quantity of one or more specially selected dyes. Many dyes have been discovered which spectrally sensitize electrophotographic materials, but some of these dyes are relatively expensive and/or are not easily incorporated into the products they are intended to dye-sensitize.

Although azomethine dyes make up a class of synthetic chemical dyes that are easily synthesized and are relatively inexpensive, they have not been used to sensitize electrophotographic materials because many azomethine dyes are not suitable for this purpose. I have found, however, that azomethine dyes with certain structures can sensitize electrophotographic materials to provide a good response to light in the visible spectrum.

SUMMARY OF THE INVENTION

The novel spectrally sensitized light-sensitive materials comprise a photoconductor and at least one azomethine dye that has either an o,o'—dihydroxy or an o—hydroxy—o'—mercapto azomethine structure.

DESCRIPTION OF THE PREFERRED EMBODIMENTS

The novel spectrally sensitized electrophotographic materials comprise a photoconductor, such as photoconductive zinc oxide, for example, commonly used in the electrophotographic recording elements, and at least one azomethine dye having, as part of its formula, the structure

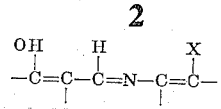

wherein X represents either a —OH or a —SH group, and the structure —CH=N— is a chromophore connecting two aryl groups. It has been found that azomethine dyes having o,o'—dihydroxy or o—hydroxy—o'—mercapto azomethine structures spectrally sensitize electrophotographic materials in the blue and/or green portion of the visible spectrum. These azomethine dyes are added to photoconductive layers, usually comprising a photoconductor in a film-forming resin, as either unmetallized dyes or as premetallized azomethine dyes complexes wherein the complexing metal is preferably the same as that in the photoconductor. Thus, where the photoconductor is zinc oxide, the premetallized azomethine dye is a zinc azomethine dye complex.

The azomethine dyes used for spectral sensitization usually do not significantly color the electrophotographic material because they are added to the material in relatively small quantities, the largest quantity being about 0.5 percent, by weight, with respect to the weight of the photoconductor of the electrophotographic material.

One can select one or more azomethine dyes to render an electrophotographic material responsive to light in a selected range of wavelengths. For examle, if an electrophotographic recording element is to be responsive to either green or blue light, as produced by certain cathode-ray tubes, the photoconductive layer is sensitized by adding one or more azomethine dyes thereto to respond to this range of wavelengths. Thus, because of the number of dyes available in the azomethine class of dyes, it is possible to spectrally sensitize electrophotographic recording elements easily and inexpensively to light in a selected range of the visible spectrum.

Table I contains a list of ten examples of azomethine dyes suitable for spectrally sensitizing electrophotographic materials. In each example, the azomethine dye is given by formula and identified by its chemical name. The region of the spectral sensitivity, produced in a photoconductive layer of zinc oxide in a film-forming resin, for each of the listed dyes is given, as determined by light passing through Wratten filters 2B (3,900 – 7,000A, visible spectrum), 47B (4,000 – 5,000A, blue), 158 (4,800 – 6,000A, green), and R25A (5,800 – 7,000A, red).

TABLE I

| No. | Structural formula | Name | Region of spectral sensitization |
|---|---|---|---|
| 1 | HO—⬡—CH=N—⬡—NO₂ (with OH, HO substituents) | 2,4-dihydroxybenzylidene-(2-amino-5-nitrophenol). | Green and blue. |
| 2 | ⬡(O—Zn—S)⬡ with —CH=N— | Salicylidene-o-aminothiophenolato-zinc (II). | Blue. |
| 3 | ⬡(O—Zn—S)⬡ with —CH=N— naphthyl | 2-hydroxy-1-naphthylidene-(2-aminothiophenolato)zinc (II). | Green and blue. |
| 4 | H₃Co OH / HO—⬡—CH=N—⬡—NO₂ | 2-hydroxy-3-methoxybenzylidene-(2-amino-5-nitrophenol). | Do. |

TABLE 1—Continued

| No. | Structural formula | Name | Region of spectral sensitization |
|---|---|---|---|
| 5 | (OH, NO₂ on one ring; CH=N link; NO₂ on other ring) | 2-hydroxy-5-nitrobenzylidene-(2-amino-5-nitrophenol). | Blue and green. |
| 6 | (OH, naphthyl; CH=N; OH, NO₂) | 2-hydroxy-1-naphthylidene-(2-amino-5-nitrophenol). | Green and blue. |
| 7 | (OH; CH=N; HO, NO₂) | Salicylidene-(2-amino-4-nitrophenol). | Blue. |
| 8 | (OH; CH=N; HO) | Salicylidene-o-aminophenol. | Do. |
| 9 | (OH; CH=N; HO; NO₂) | Salicylidene-(2-amino-5-nitrophenol). | Green and blue. |
| 10 | (O—Zn—S chelate; CH=N; NO₂) | Salicylidene-(2-amino-4-nitrophenolatozinc (II)). | Blue. |

The following are examples of the manufacture of novel spectrally sensitized electrophotographic materials employing some of the azomethine dyes listed in Table I.

EXAMPLE I

In a solution of 3 ml of methanol and 30 ml of toluene, 0.005 g of salicylidene-(2-amino-5-nitrophenol) was dissolved. To the dye solution, 10 g of the resin Coat Rez 6RW 37 (50 percent solids, Stein Hall and Company) and 30 g of photoconductive zinc oxide, AZO ZZZ 661, American Zinc Sales Company, was added. The suspension was mixed in a Waring Blender for 7 minutes, and the formulation was coated on a base stock paper treated for electrophotographic uses (Riegel Paper Company) with a wire rod. The coated paper was air and oven dried. The dye concentration of the layer was 0.017 percent, based on the weight of zinc oxide.

Samples of the dye-sensitized, coated electrophotographic paper were exposed through Wratten filters (2B, 47B, 58, R25A) to light from a 100 watt incandescent bulb spaced 2 ft. from the filters. Images were produced by developing with a liquid, direct, electroscopic toner. The paper exhibited spectral sensitivity in the wavelength range 3,800–6,000A. The spectrally sensitized paper was most sensitive to green wavelengths, 5,000–6,000A. Spectrograms of the paper showed the coating to be sensitive to band gap light of a wavelength of approximately 3,800A and spectrally sensitized to wavelengths between 4,000–5,600A. Maximum spectral sensitivity occurred at about 5,000A.

EXAMPLE II

Into a solution containing 2 ml of methanol and 30 ml of toluene, 0.003 g of recrystallized salicylidene-o-aminophenol (Aldrich Chemical Company, Inc.) was dissolved. To the dye solution was added 10 g of the resin solution Coat Rez 6RW 37 (50 percent solids, Stein Hall and Company). The resin solution was adjusted to pH 7 with N-methylcyclohexylamine (Abbott Laboratories). To the solution, 30 g of photoconductive zinc oxide, AZO ZZZ 661 (American Zinc Sales) was added, and the suspension mechanically agitated for several days. The dye concentration was 0.01 percent, based on the weight of zinc oxide. Before coating, the suspension was further dispersed by blending for 4 minutes in a Sorvall mixer. The coating formulation was placed on a conductive electrophotographic base paper (Riegel Paper Company) with a pilot-sized laboratory coater. The color of the paper was slightly off-white.

Spectrograms of the coating indicated sensitivity to band gap light of a wavelength of 3,800A, and spectral sensitivity to wavelengths in the 4,000–4,700A range. Maximum spectral sensitivity occurred at approximately 4,400A.

EXAMPLE III

In a solution of 2 ml of methanol and 30 ml of toluene, 0.003 g of recrystallized salicylidene-(2-amino-4-nitrophenol), prepared by the condensation of salicylaldehyde and 2-amino-4-nitrophenol, was dissolved. To the dye solution, 10 g of the resin Coat Rez 6RW 37 (50 percent solids, Stein Hall and Company) was added. The pH of the solution was adjusted to 7 with N-methylcyclohexylamine, (Abbott Laboratories). Next, 30 g of photoconductive zinc oxide, AZO ZZZ 661 (American Zinc Sales) was added to the solution and the suspension mechanically agitated for several days. Before applying to a substrate, the formulation was mixed in a Sorvall mixer for 4 minutes. The dye concentration was 0.01 percent, based on the weight of zinc oxide. The coating was applied onto a conductive base paper prepared for electrophotographic purposes (Riegel Paper Company) using a pilot-sized laboratory coater.

Samples of the coating were exposed through Wratten filters (2B, 47B, 58, R25A) to light from a 100 watt incandescent bulb spaced 2 ft. from the filters. The images were developed with a liquid, direct, electroscopic toner. The paper showed spectral sensitivity in the 3,800–5,000A range. Spectrograms of the paper showed that spectral sensitization occurred in the 4,000–4,900A wavelength region in addition to the intrinsic sensitivity at 3,800A. The maximum in spectral sensitivity occurred at 4,500A.

EXAMPLE IV

In a solution containing 2 ml of methanol and 30 ml of toluene, 0.003 g of 2-hydroxy-1-naphthylidene-(2-amino-5-nitrophenol) was dissolved. To the dye solution, 10 g of the resin Coat Rez 6RW 37 (50 percent solids, Stein Hall and Company) was added. The pH of the solution was adjusted to 7 by the addition of N-Methylcyclohexylamine (Abbott Laboratories) and 30 g of photoconductive zinc oxide, AZO ZZZ 661 (American Zinc Sales), was added. The suspension was mechanically agitated for several days. Before applying as a coating, the suspension was further dispersed by blending in a Sorvall mixer for 7 minutes. The coating was applied to a conductive electrophotographic base paper (Riegel Paper Company) using a pilot-sized laboratory coater. The dye concentration was 0.01 percent based on the weight of zinc oxide.

Spectrograms of the coating showed spectral sensitivity to light in the 4,500–5,800A wavelength range. The maximum of spectral sensitization occurred at about 5,200A. The coating was also sensitive to the 3,800A band gap energy.

Samples of the coating were exposed through Wratten filters (2B, 47B, 58, R25A), to light from a 100 watt incandescent bulb spaced 2 ft. from the filters. The images were developed with a liquid, direct, electroscopic toner. The electrophotographic coatings spectrally sensitized with this dye exhibited sensitization to light with wavelengths between 4,000–6,000A. The imaged samples showed that spectral sensitivity due to the dye was mainly in the 5,000–6,000A range.

EXAMPLE V

Yellow solid, salicylidene-(2-amino-4-nitrophenolato) zinc (II), was prepared by reacting an acetone solution of salicylidene-(2-amino-4-nitrophenol) with a slight excess of aqueous zinc acetate, (N. F. Granular, Fisher Scientific Company). The yellow precipitate was separated, purified by repeated washings, and vacuum dried.

Approximately 0.003 g of metallized azomethine dyestuff was dissolved in a large volume of acetone to give a yellow solution. Thirty grams of photoconductive zinc oxide, AZO ZZZ 661 (American Zinc Sales) was added to the zinc complex solution, and the suspension shaken by hand for 3 minutes. The complex readily absorbed on the zinc oxide to produce a pale yellow solid and a colorless supernatant. The dyed zinc oxide was separated and dried.

The dyed photoconductive zinc oxide was used to make a 6:1 zinc oxide-to-resin ratio electrophotographic coating, using the resin Coat Rez 37 (50 percent solids, Stein Hall and Company). Agitation by hand was used to disperse the zinc oxide. The coating was placed on a conductive electrophotographic base stock paper (Riegel Paper Company) with a wire rod.

Samples of the electrophotographic coating were exposed through Wratten filters (2B, 47B, 58, R25A), to the light from a 100 watt incandescent bulb spaced 2 ft. from the filters. Images on the samples were developed with a liquid, direct, electroscopic toner. The electrophotographic coating spectrally sensitized with this complex exhibited photoconductivity to wavelengths of light between 3,800 and 5,000A. The spectral sensitivity of this coating was the same as that of the electrophotographic coating spectrally sensitized with the unmetallized dyestuff described in Example III.

EXAMPLE VI

The zinc (II) complex of an o-hydroxy-o'-mercaptoazomethine dye, salicylidene-o-aminothiophenolatozinc (II), was used to prepare a spectrally sensitive electrophotographic paper. The complex was prepared by reacting the bis-salicylaldehyde -zinc complex in absolute ethanol at room temperature with o-aminothiophenol. The complex was isolated as a yellow crystalline material.

Ten milligrams of the zinc complex dyestuff was dissolved in 2 ml of methanol and the solution diluted with 30 ml of toluene. To the complex solution was added 10 g of Coat Rez 6RW 37 (50 percent solids, Stein Hall and Company) and, then, 30 g of photoconductive zinc oxide, AZO ZZZ 661, (American Zinc Sales). The oxide was dispersed ultrasonically, and the coating formulation applied to conductive electrophotographic base paper (Riegel Paper Company).

Samples of the electrophotographic coating were exposed through Wratten filters (2B, 47B, 58, R25A) to the light from a 100 watt incandescent bulb spaced 2 ft. from the filters. Images on the samples were developed with a liquid, direct, electroscopic toner. The electrophotographic coating, spectrally sensitized with this complex, exhibited photoconductivity in the range of wavelengths between 3,800 and 5,000A. Spectrograms of the coated paper showed that spectral sensitization occurred in the 3,900–4,500A wavelength region. The maximum of spectral sensitivity occurred at approximately 4,300A.

It is believed that the free azomethine dyes of the above examples form metal complexes with the metal ions of the photoconductor. Thus, it is believed that the o,o'-dihydroxy or o'-hydroxy-o'-mercapto azomethine dyes of the class listed in Table I form zinc azomethine dye complexes in the photoconductive layers when the photoconductor is photoconductive zinc oxide. Also, metal complexes of the azomethine dyes, wherein the complexing metal is the same as that of the photoconductor, may be used for light sensitization in place of the free dyes in the aforementioned examples. The preformed or in situ formed azomethine dye complexes are believed to be adsorbed on the surface of the photoconductor.

While the quantities of the azomethine dyes in each of the aforementioned formulations of photoconductive layers is less than 0.5 percent by weight of the weight of the photoconductor, up to about 0.5 percent of the dye by weight of the photoconductor may be used for spectral sensitization. Also, the other quantities used in the aforementioned examples are not critical and may be varied to produce photoconductor layers with desired characteristics, in a manner known in the art.

I claim:

1. Spectrally sensitized light-sensitive material comprising a photoconductor and at least one azomethine dye having an o,o'dihydroxy or an o-hydroxy-o'-mercapto azomethine structure.

2. Spectrally sensitized light-sensitive material as described in claim 1, wherein:
   said photoconductor is zinc oxide and said azomethine dye is a zinc azomethine dye complex.

3. Spectrally sensitized electrophotographic material comprising a photoconductor and an azomethine dye having a structure

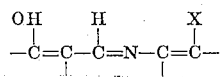

wherein X represents a —OH or a —SH group and the structure —CH=N— is a chromophore connecting two aryl groups.

4. Spectrally sensitized electrophotographic material as described in claim 3 wherein:
   said photoconductor is photoconductive zinc oxide.

5. Spectrally sensitized light-sensitive material comprising a photoconductor of zinc oxide and at least one azomethine dye selected from the group consisting of azomethine dyes listed in Table I herein.

6. A spectrally sensitized electrophotographic recording element comprising a photoconductive layer of zinc oxide in a film-forming binder and a sensitizing amount up to about 0.5 percent by weight with respect to the weight of the zinc oxide of an azomethine dye selected from the group consisting of azomethine dyes in Table I herein.

* * * * *